US012801990B2

(12) United States Patent
Xiao et al.

(10) Patent No.: US 12,801,990 B2
(45) Date of Patent: Nov. 17, 2026

(54) PERSONALIZED HYPERPARAMETER TUNING WITH CONTEXTUAL MULTI-ARM BANDIT AND REINFORCEMENT LEARNING

(71) Applicant: ROKU, INC., San Jose, CA (US)

(72) Inventors: Fei Xiao, San Jose, CA (US); Zidong Wang, San Jose, CA (US); Lian Liu, Rancho Palos Verdes, CA (US); Nam Vo, San Jose, CA (US); Weicong Ding, San Jose, CA (US); Abhishek Bambha, Burlingame, CA (US); Amit Verma, Sunnyvale, CA (US); Aasish Sipani, Danville, CA (US); Rohit Mahto, San Jose, CA (US); Hossein Dabirian, College Station, TX (US); Jose Sanchez, San Jose, CA (US)

(73) Assignee: ROKU, INC., San Jose, CA (US)

( * ) Notice: Subject to any disclaimer, the term of this patent is extended or adjusted under 35 U.S.C. 154(b) by 610 days.

(21) Appl. No.: 18/232,468

(22) Filed: Aug. 10, 2023

(65) Prior Publication Data

US 2025/0053853 A1 Feb. 13, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 11,481,620 | B2 * | 10/2022 | Khapali | G06N 3/082 |
| 11,797,891 | B1 * | 10/2023 | Musiboyina | G06N 3/006 |
| 2020/0394473 | A1 * | 12/2020 | Dudik | G06F 18/2148 |

(Continued)

OTHER PUBLICATIONS

Li et al. "*A Contextual-Bandit Approach to Personalized News Article Recommendation*," Proceedings of the 19th International Conference on World Wide Web (WWW 2010) Raleigh, NC, USA, Apr. 2010, retrieved from https://doi.org/10.48550/arXiv.1003.0146, 10 pages.

(Continued)

*Primary Examiner* — Chikaodili E Anyikire
(74) *Attorney, Agent, or Firm* — Sterne, Kessler, Goldstein & Fox P.L.L.C.

(57) ABSTRACT

Disclosed are system, method and/or computer program product embodiments for improving the performance of a machine learning based algorithm used to provide a user experience to a user via a media device. An embodiment selects a first set of hyperparameter values, implements a first iteration of the algorithm based on the first set of hyperparameter values, utilizes the first iteration of the algorithm to provide a first user experience to the user, determines a response of the user to the first user experience, selects, by a hyperparameter tuning ML model implemented as a contextual multi-arm bandit model or a reinforcement learning model and based on at least the response of the user, a second set of hyperparameter values, implements a second iteration of the algorithm based on the second set of hyper-parameter values, and utilizes the second iteration of the algorithm to provide a second user experience to the user.

20 Claims, 6 Drawing Sheets

(56) References Cited

U.S. PATENT DOCUMENTS

| | | | | |
|---|---|---|---|---|
| 2021/0325894 | A1* | 10/2021 | Faust ..................... | G06N 3/082 |
| 2024/0194341 | A1* | 6/2024 | Van Der Linden .. | G06N 3/0985 |
| 2024/0289639 | A1* | 8/2024 | Worth .................... | G06N 3/006 |

OTHER PUBLICATIONS

Lillicrap, T. et al. "*Continuous Control With Deep Reinforcment Learning*," Published as a conference paper at International Conference on Learning Representations, May 2, 2016-May 4, 2016, retrieved from https://arxiv.org/pdf/1509.02971.pdf, 14 pages.

* cited by examiner

PERSONALIZED HYPERPARAMETER TUNING WITH CONTEXTUAL MULTI-ARM BANDIT AND REINFORCEMENT LEARNING

BACKGROUND

Field

This disclosure is generally directed to online hyperparameter tuning, and more particularly to personalized online hyperparameter tuning for improving the performance of a machine learning (ML) based algorithm used to provide a user experience to a user via a media device.

SUMMARY

Provided herein are system, apparatus, article of manufacture, method and/or computer program product embodiments, and/or combinations and sub-combinations thereof, for performing personalized online hyperparameter tuning to improve the performance of a machine learning (ML) based algorithm used to provide a user experience to a user via a media device. An embodiment selects a first set of hyperparameter values, implements a first iteration of the ML based algorithm based on the first set of hyperparameter values, utilizes the first ML model to provide a first user experience to the user via the media device, determines a response of the user to the first user experience, selects, by a hyperparameter tuning ML model comprising one of a contextual multi-arm bandit (CMAB) model or a reinforcement learning (RL) model and based at least on the response of the user, a second set of hyperparameter values, implements a second iteration of the ML based algorithm based on the second set of hyperparameter values, and utilizes the second iteration of the ML based algorithm to provide a second user experience to the user via the media device.

In an embodiment, implementing the first iteration of the ML based algorithm based on the first set of hyperparameter values comprises controlling a training process in accordance with the first set of hyperparameter values to generate a first iteration of an ML model used by the ML based algorithm, and implementing the second iteration of the ML based algorithm based on the second set of hyperparameter values comprises controlling the training process in accordance with the second set of hyperparameter values to generate a second iteration of the ML model used by the ML based algorithm.

In another embodiment, implementing the first iteration of the ML based algorithm based on the first set of hyperparameter values comprises selecting a first ML model to be used by the ML based algorithm from among a set of candidate ML models based on the first set of hyperparameter values, and wherein implementing the second iteration of the ML based algorithm based on the second set of hyperparameter values comprises selecting a second ML model to be used by the ML based algorithm from among the set of candidate ML models based on the second set of hyperparameter values.

In yet another embodiment, the hyperparameter tuning ML model comprises the CMAB model and selecting the second set of hyperparameter values comprises selecting, by the CMAB model and based at least on context information and the response of the user, the second set of hyperparameter values.

In still another embodiment, the hyperparameter tuning ML model comprises the RL model and selecting the second set of hyperparameter values comprises selecting, by the RL model and based at least on state information and the response of the user, the second set of hyperparameter values.

In a further embodiment, selecting the second set of hyperparameter values comprises selecting whether to increment or decrement each hyperparameter value in the first set of hyperparameter values by a fixed number of discrete steps.

In a yet further embodiment, selecting the second set of hyperparameter values comprises determining, by the hyperparameter tuning ML model and based at least on the response of the user, a deterministic policy or a stochastic policy, and selecting the second set of hyperparameter values based on the deterministic policy or the stochastic policy.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
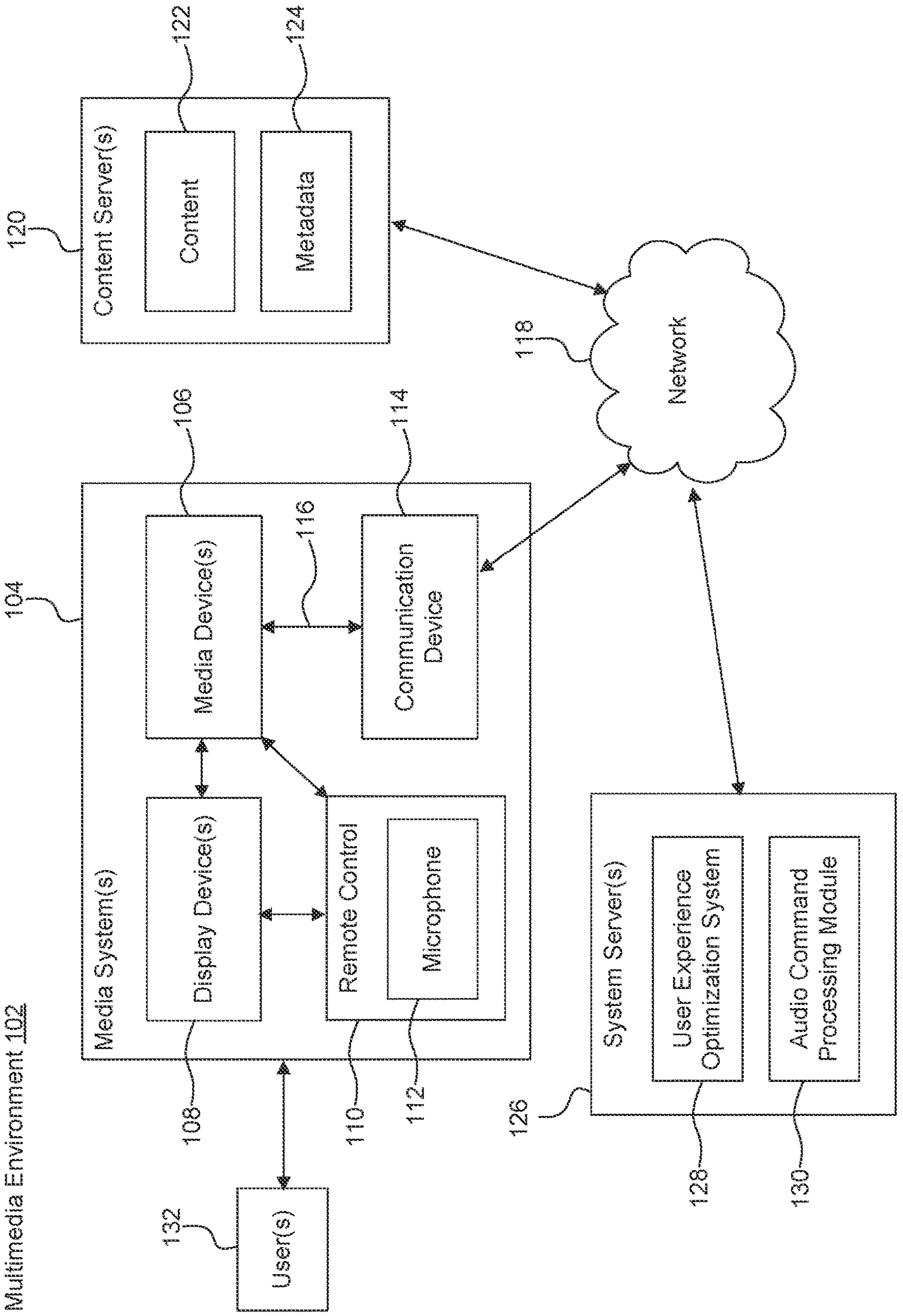
FIG. 1 illustrates a block diagram of a multimedia environment, according to some embodiments.

As used herein, the term "machine learning (ML) based algorithm" refers to an algorithm that utilizes one or more ML models. An ML based algorithm may be used to provide a user experience to different remote media devices. For example, the ML based algorithm may be used to control how content recommendations are provided to the different remote media devices, how a user interface is displayed on the different media devices, or how content is streamed to the different remote media devices. The ML based algorithm may determine what type of user experience to provide to the different remote media devices based on model parameters of an ML model utilized by the algorithm. The model parameters of the ML model may be determined as part of a training process. Training the ML model may involve determining a set of model parameters that minimizes or maximizes an objective function when the ML model is applied to a training data set. The objective function that is sought to be minimized or maximized may be determined based on an aspect of the user experience that is sought to be optimized.

Hyperparameters may include parameters that are set before the beginning of the training process and control the training process itself. Unlike model parameters, such hyperparameters are not learned during training and are not directly related to the training data. Rather, the values of such hyperparameters are typically specified manually by an ML engineer or practitioner. However, the values selected for such hyperparameters may impact the ability of the ML model to minimize or maximize the objective function and thus the ability of the ML based algorithm to provide an optimal user experience. Hyperparameter tuning may comprise a process by which different hyperparameter values are explored to identify value combinations that improve or optimize the degree to which an ML model can minimize or maximize the objective function.

Depending upon the ML model, there may be many (e.g., hundreds of) hyperparameters that must be tuned to discover the model parameters that best enable the ML model to maximize or minimize the objective function. Moreover, the relationship between these hyperparameters and the ability of the ML model to maximize or minimize the objective function may be unclear. As a result, hyperparameters are often tuned offline and then remain fixed while the ML model is used in an online environment, even though the ML model in the online environment may be performing sub-optimally.

Hyperparameters may also include parameters that are used to control other aspects of how an ML based algorithm is implemented. For example, hyperparameters may be used to control the selection of a particular ML model from among a set of candidate ML models for use by an ML based algorithm, to select weights for combining predictions or scores generated by different ML models used by an ML based algorithm, to select a value of a boosting factor that is applied to a ranking score generated by an ML model used by an ML based algorithm, or to select weights for determining a user interest distribution for recommendations generated by an ML model used by an ML based algorithm. Such hyperparameters are also often tuned offline due to the challenge associated with determining the relationship between hyperparameter values and the performance of the ML based algorithm.

Another issue with some conventional hyperparameter tuning techniques is that they evaluate the hyperparameter values based on the performance of an ML based algorithm or ML model with respect to a large user base. Thus, the hyperparameters may be tuned to deliver a user experience that is deemed optimal with respect to the entire user base, but that may fail to account for different user preferences.

Provided herein are system, apparatus, article of manufacture, method and/or computer program product embodiments, and/or combinations and sub-combinations thereof, for performing personalized online hyperparameter tuning to improve the performance of a machine learning (ML) based algorithm used to provide a user experience to a user via a media device. An embodiment selects a first set of hyperparameter values, implements a first iteration of an ML based algorithm based on the first set of hyperparameter values, utilizes the first iteration of the ML based algorithm to provide a first user experience to the user via the media device, determines a response of the user to the first user experience, selects, by a hyperparameter tuning ML model comprising one of a contextual multi-arm bandit (CMAB) model or a reinforcement learning (RL) model and based at least on the response of the user, a second set of hyperparameter values, implements a second iteration of the ML based algorithm based on the second set of hyperparameter values, and utilizes the second iteration of the ML based algorithm to provide a second user experience to the user via the media device.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include a user experience optimization system 128. User experience optimization system 128 may be configured to provide a user experience to different media devices 106 respectively associated with different users 132. For example and without limitation, user experience optimization system 128 may be configured to control how content recommendations are provided to different media devices 106, how a user interface is displayed by different media devices 106, or how content is streamed to different media devices 106. User experience optimization system 128 may utilize a machine learning (ML) based algorithm to optimize the user experience that is provided to the different media devices 106, wherein the nature of the optimization may vary depending upon the implementation. Furthermore, user experience optimization system 128 may perform personalized online hyperparameter tuning to improve the performance of the ML based algorithm with respect to achieving the relevant optimization. Further description regarding user experience optimization system 128 will be provided below in reference to FIGS. 3-5.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing.

Figure 2:
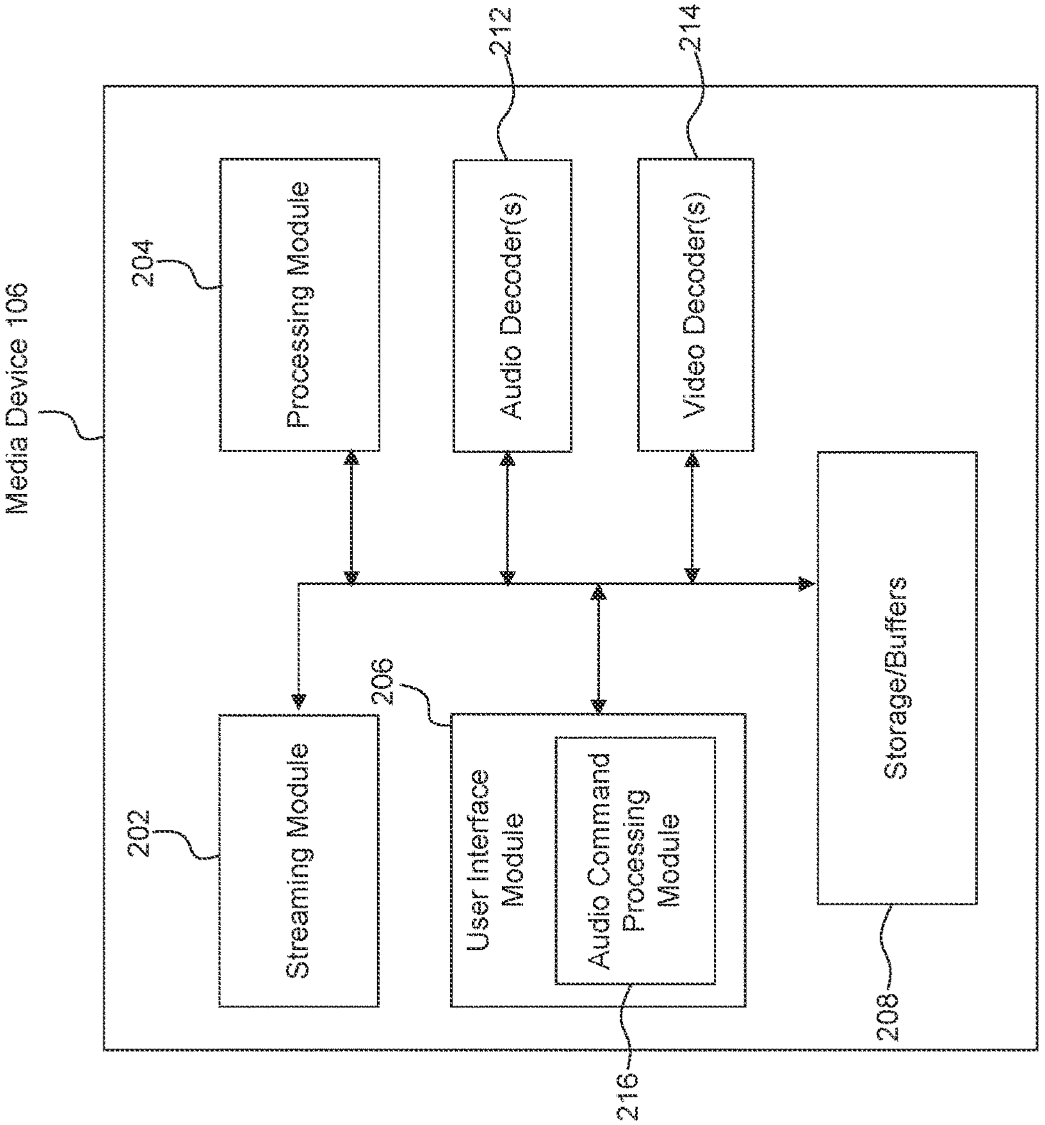
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Figure 3:
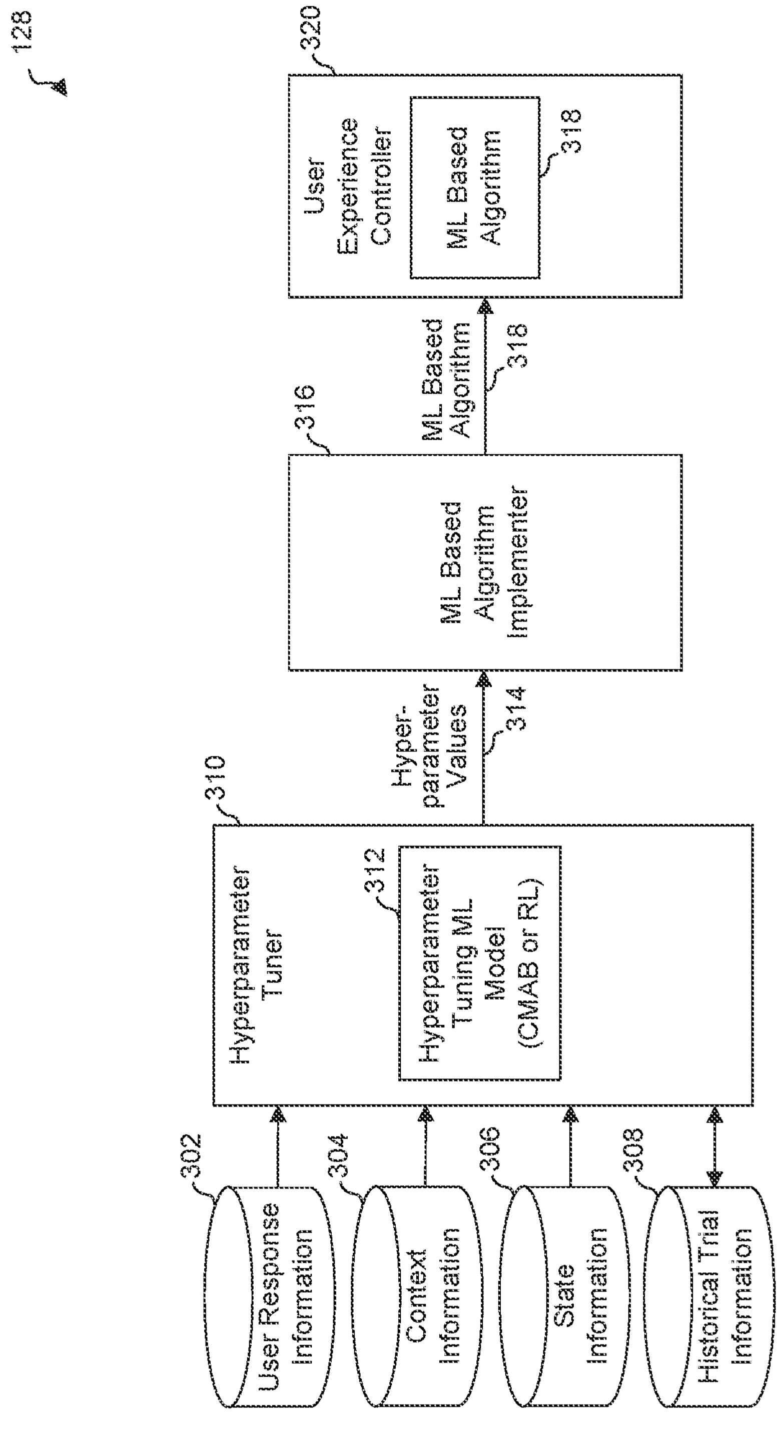
FIG. 3 illustrates a block diagram of a user experience optimization system, according to some embodiments.

User Experience Optimization System with Personalized Online Hyperparameter Tuning FIG. 3 illustrates a block diagram of user experience optimization system 128, according to some embodiments. As noted above, user experience optimization system 128 may be implemented by system server(s) 126 in multimedia environment 102 of FIG. 1. As also noted above, user experience optimization system 128 may be configured to provide a user experience to different media devices 106 respectively associated with different users 132. For example, user experience optimization system 128 may be configured to control how content recommendations are provided to different media devices 106, how a user interface is displayed by different media devices 106, or how content is streamed to different media devices 106. However, these are merely examples, and persons skilled in the relevant art(s) will appreciate that user experience optimization system 128 may be configured to provide a user experience to media devices 106 in numerous other ways.

User experience optimization system 128 may use an ML based algorithm (e.g., ML based algorithm 318) to optimize the user experience that is provided to the different media devices 106, wherein the nature of the optimization may vary depending upon the implementation. For example, in an embodiment in which user experience optimization system 128 is configured to control how content recommendations are provided to media devices 106, the optimization may be to recommend content that a user is most likely to interact with (e.g., click on, launch for playback, or watch/stream) or, in an embodiment in which different content items generate different amounts of revenue when interacted with by a user, to recommend content that will maximize long-term revenue. As another example, in an embodiment in which user experience optimization system 128 is configured to control how a user interface is displayed by different media devices 106, the optimization may be to present the user interface in a manner that enables users to access desired information or content in the most efficient way possible or in a form that is easiest to interact with. As yet another example, in an embodiment in which user experience optimization system 128 is configured to control how content is streamed to different media devices 106, the optimization may be to utilize content streaming parameters (e.g., resolution, bit rate, frame rate, encoding type, or the like) that provide an acceptable viewing experience for a user while also maximally conserving certain system resources (e.g., server or media device processor cycles, server or media device system memory, or network bandwidth). These are just a few examples.

The ML based algorithm may determine what type of user experience to provide to the different remote media devics based on model parameters of an ML model utilized by the algorithm. For example, a training process may be used to determine a set of model parameters that minimizes or maximizes an objective function when the ML model is applied to a training data set. The objective function that is sought to be minimized or maximized may be determined, for example, based on an aspect of the user experience that is sought to be optimized. Examples of ML model parameters include, but are by no means limited to, weights and biases of an artificial neural network, support vectors in a support vector machine, or coefficients in a linear regression or logistic regression model.

The degree to which the ML model can minimize or maximize the aforementioned objective function may be impacted by hyperparameters of the ML model. Hyperparameters may include parameters that are set before the beginning of the training process and control the training process itself. Unlike model parameters, such hyperparameters are not learned during training and are not directly related to the training data. Some examples of such hyperparameters include but are not limited to a train-test split ratio, a learning rate in optimization algorithms (e.g., gradient descent), a choice of optimization algorithm (e.g., gradient descent, stochastic gradient descent, or Adam optimizer), a choice of activation function in a neural network layer (e.g., Sigmoid, ReLU, Tanh), a number of hidden layers in a neural network, a number of activation units in each layer of a neural network, a drop-out probability in a neural network, a number of iterations (epochs) in training a neural network, a number of clusters in a clustering task, a kernel or filter size in convolutional layers of a convoluational neural network, C and Gamma values in a support vector machine, or a k value in a k-nearest neighbors algorithm. In conventional systems that rely on ML models, such hyperparameter values are often specified manually by an ML engineer or practitioner.

Hyperparameter tuning may comprise a process by which different hyperparameter values are explored to identify value combinations that improve or optimize the degree to which an ML model can minimize or maximize the aforementioned objective function. Depending upon the ML model, there may be many (e.g., hundreds of) hyperparameters that must be tuned in order to discover the model parameters that best enable the ML model to maximize or minimize the objective function. Moreover, the relationship between these hyperparameters and the ability of the ML model to maximize or minimize the objective function may be unclear. As a result, in conventional systems that rely on ML models, hyperparameters are often tuned offline and then remain fixed while the ML model is used in an online environment, even though the ML model in the online environment may be performing suboptimally.

Hyperparameters may also include parameters that are used to control other aspects of how an ML based algorithm is implemented. For example, hyperparameters may be used to control the selection of a particular ML model from among a set of of candidate ML models for use by an ML based algorithm, to select weights for combining predictions or scores generated by different ML models used by an ML based algorithm, to select a value of a boosting factor that is applied to a ranking score generated by an ML model used by an ML based algorithm, or to select weights for determining a user interest distribution for recommendations generated by an ML model used by an ML based algorithm. Such hyperparameters are also often tuned offline due to the challenge associated with determining the relationship between hyperparameter values and the performance of the ML based algorithm.

To address this technical issue and as will be discussed in more detail herein, user experience optimization system 128 may include a hyperparameter tuner (e.g., hyperparameter tuner 310) that performs online automatic hyperparameter tuning to identify a hyperparameter value combination that improves or optimizes the performance of an ML based algorithm or the degree to which the ML model can minimize or maximize the aforementioned objective function.

Another issue with some conventional hyperparameter tuning techniques is that they evaluate the hyperparameter values based on the performance of an ML based algorithm with respect to a large user base. Thus, the hyperparameters are tuned to deliver a user experience that is deemed optimal with respect to the large user base, but that may fail to account for different user preferences. To address this technical issue and as will be discussed in more detail herein, user experience optimization system 128 may maintain a distinct set of hyperparameter values for each user in a plurality of users that it optimizes over time using a hyperparameter tuning ML model. The hyperparameter tuning ML model may be implemented, for example, as a contextual multi-armed bandit (CMAB) model or a reinforcement learning (RL) model. The CMAB or RL model may explore different hyperparameter value combinations for a user across a series of trials, wherein, during each trial, a particular hyperparameter value combination is used to implement an ML based algorithm and the ML based algorithm is used to provide a user experience to the user via a media device. The user's response to each such user experience is evaluated. Through this process, the CMAB or RL model may learn an optimal set of hyperparameter values for the user.

As shown in FIG. 3, user experience optimization system 128 may comprise a hyperparameter tuner 310, an ML based algorithm implementer 316 and a user experience controller 320. Each of these components may be implemented by processing logic that can comprise hardware (e.g., circuitry, dedicated logic, programmable logic, microcode, etc.), software (e.g., instructions executing on a processing device), or a combination thereof. Each of these components will now be described.

Hyperparameter tuner 310 may operate to select a set of hyperparameter values 314 for each trial t in a series of user experience trials, t=1, 2, 3, . . . . The set of hyperparameter values 314 comprise values or settings associated with a corresponding set of hyperparameters, wherein the set of hyperparameters may comprise one hyperparameter or more than one hyperparameter. As will be discussed herein, the set of hyperparameter values 314 selected for trial t may be used to implement an ML based algorithm 318 that will be used to control a user experience that will be provided to user 132 during trial t. The duration of a trial may depend upon the implementation, and may be a configurable operating parameter of user experience optimization system 128.

Hyperparameter tuner 310 utilizes a hyperparameter tuning ML model 312 to select the set of hyperparameter values 314 for each user experience trial t. Hyperparameter tuning ML model 312 may comprise, for example, one of a contextual multi-arm bandit (CMAB) model or a reinforcement learning (RL) model. In particular, hyperparameter tuner 310 provides a number of inputs to hyperparameter tuning ML model 312 and, based on those inputs, hyperparameter tuning ML model 312 selects the set of hyperparameter values 314 for trial t. As shown in FIG. 3, the inputs may include user response information 302, context information 304, state information 306, and/or historical trial information 308.

User response information 302 may include information concerning a response of user 132 to a user experience provided to user 132 during a previous user experience trial, which may be thought of as trial t−1. Such user response information 302 may be used to determine a reward associated with trial t−1 that may be considered by hyperparameter tuning ML model 312 in determining the set of hyperparameter values 314 associated with trial t.

User response information 302 may include, for example, any of a number of metrics relating to a manner in which user 132 interacted with a user interface (e.g., with controls and/or content items presented as part of the user interface) provided by media system 104 and/or media device(s) 106 during trial t−1. In embodiments, user response information 302 may be obtained or otherwise derived from system logs that record user interactions with the user interface. The metrics that are relevant may depend on the aspect of the user experience that is sought to be optimized by user experience optimization system 128. For example, if the optimization is to recommend content that a user is most likely to interact with, then the relevant metrics may include user clicks, launches and/or streaming time during trial t−1. As another example, if the optimization is to recommend content that will maximize long-term revenue, then the relevant metrics may include an amount of revenue generated by user 132 during trial t−1. However, these are only examples. Numerous other items of information representative of a user response to a user experience may be included in user response information 302, depending upon the implementation.

Context information 304 may comprise any type of information describing a circumstance or setting that may be taken into account when generating the set of hyperparameter values 314 for trial t. By way of example only and without limitation, context information 304 may include temporal information such as the day of the week, the time of day, or the date, a location of user 132, or a device type being used by user 132. Still other types of information may be included in context information 304.

State information 306 may comprise information relating to a state of user 132. For example, in embodiments, state information 306 may comprise one or more metrics or indicators relating to the interaction of user 132 with media system 104 and/or media device(s) 106. By way of further example, state information 306 may include one or more of a retention rate associated with user 132, a measure of activity of user 132 with respect to media system 104 and/or media device 106, a measure of engagement by user 132 with content items per session with media system 104 and/or media device 106, an indication of diversified items viewed/consumed by the user 132, and/or exploration and collaborative filtering information associated with a user interest of user 132. State information 306 may include other metrics or indicators relating to the interaction of user 132 with media system 104 and/or using media device 106. In some embodiments, the metrics or indicators may be based on data collected both during and before the previous user experience trial, such that state information 306 presents a more long-term view of user 132 than, for example, the aforementioned user response information 302 which may be based only on data collected during the previous user experience trial.

In embodiments, user state information 306 may include other information about user 132, including but not limited to demographic data about user 132.

Historical trial information 308 may comprise information about previous trials for which the set of hyperparameter values 314 was selected and for which a corresponding user experience was generated. For example, in embodiments, historical trial information 308 specifies or otherwise represents, for each of one or more prior trials, the set of hyperparameter values 314 that was selected by hyperparameter tuning ML model 312 and user response information 302 with respect to a user experience provided based on those hyperparameter values. In further embodiments, historical trial information 308 may further specify or otherwise represent, for each of one or more prior trials, context information 304 that was provided to hyperparameter tuning ML model 312 and/or state information 306 that was provided to hyperparameter tuning ML model 314.

After hyperparameter tuning ML model 312 has selected the set of hyperparameter values 314 for user experience trial t, hyperparameter tuner 310 provides such set of hyperparameter values 314 to ML based algorithm implementer 316.

ML based algorithm implementer 316 may operate to implement ML based algorithm 318 based on the set of hyperparameter values 314. For example, ML based algorithm implementer 316 may control a training process in accordance with the set of hyperparameter values 314 to generate an ML model used by ML based algorithm 318. In embodiments, ML based algorithm implementer 316 may select an ML model to be used by ML based algorithm 318 from among a set of candidate ML models based on the set of hyperparameter values 314. ML based algorithm 318 that is implemented by ML based algorithm implementer 318 is deployed to an online environment as part of user experience controller 320.

User experience controller 320 may utilize ML based algorithm 318 to control a user experience that is provided to user 132 via media device 106 during trial t. For example, user experience controller 320 may utilize ML based algorithm 318 to identify content to recommend to user 132 via media device 106 during trial t, to determine a format and/or content of a user interface that will be displayed to user 132 via media device 106 during trial t, or to select a set of content streaming parameters (e.g., resolution, bit rate, frame rate, encoding type, or the like) that will be used to stream content to user 132 via media device 106 during trial t. However, these are only a few examples, and user experience controller 320 may use ML based algorithm 318 to control any aspect of a user experience to be provided to user 132 via media device 106 during trial t.

During user experience trial 1, user experience optimization system 128 may monitor a response of user 132 to the current user experience, (e.g., by monitoring interactions by user 132 with a user interface provided by media device 106) and update user response information 302 accordingly. After user experience trial t ends, and at the beginning of user experience trial t+1, user experience optimization system 128 may also update context information 304 and state information 306 to reflect any changes thereto, as well as historical trial information 308. Hyperparameter tuner 310 may then provide some or all of these revised inputs (user response information 302 for trial 1, updated context information 330, updated state information 304, and updated historical trial information 306) to hyperparameter tuning ML model 312 to generate a new set of hyperparameter values 314 for trial t+1. The new set of hyperparameter values 314 may then be used to implement a new (e.g., updated iteration of) ML based algorithm 318 for user 132 for user experience trial t+1. User experience optimization system 128 may iteratively repeat this process for each content recommendation trial t=1, 2, 3, . . . .

In embodiments, hyperparameter tuning ML model 312 may comprise a CMAB model, such as a LinUCB algorithm or a LinRel algorithm. The CMAB model may operate based on user response information 302, context information 304 and historical trial information 308 to predict a set of hyperparameter values 314 that will optimize a user experience controlled by user experience controller 320. For example, the CMAB model may predict a set of hyperparameter values 314 that will best enable an ML model used by ML based algorithm 318 to maximize or minimize a particular objective function. CMAB algorithms such as LinUCB can take into account context information (e.g., a context vector) along with historical action-reward information (as represented by historical trial information 306) in selecting the set of hyperparameter values 314. This enables the algorithm to search for the best set of hyperparameter values 314 within a number of different contexts, wherein each context may be thought of as presenting its own MAB. This may be particularly useful in scenarios in which user 132 is actually a single user account that is being shared by multiple different users, as it allows the CMAB model to utilize context clues to, in effect, distinguish between the different users and thereby tune a different set of hyperparameters for each. The LinUCB algorithm is described in L. Li et al., "A Contextual-Bandit Approach to Personalized News Article Recommendation," WWW '10, pp. 661-670 (2010).

Figure 4:
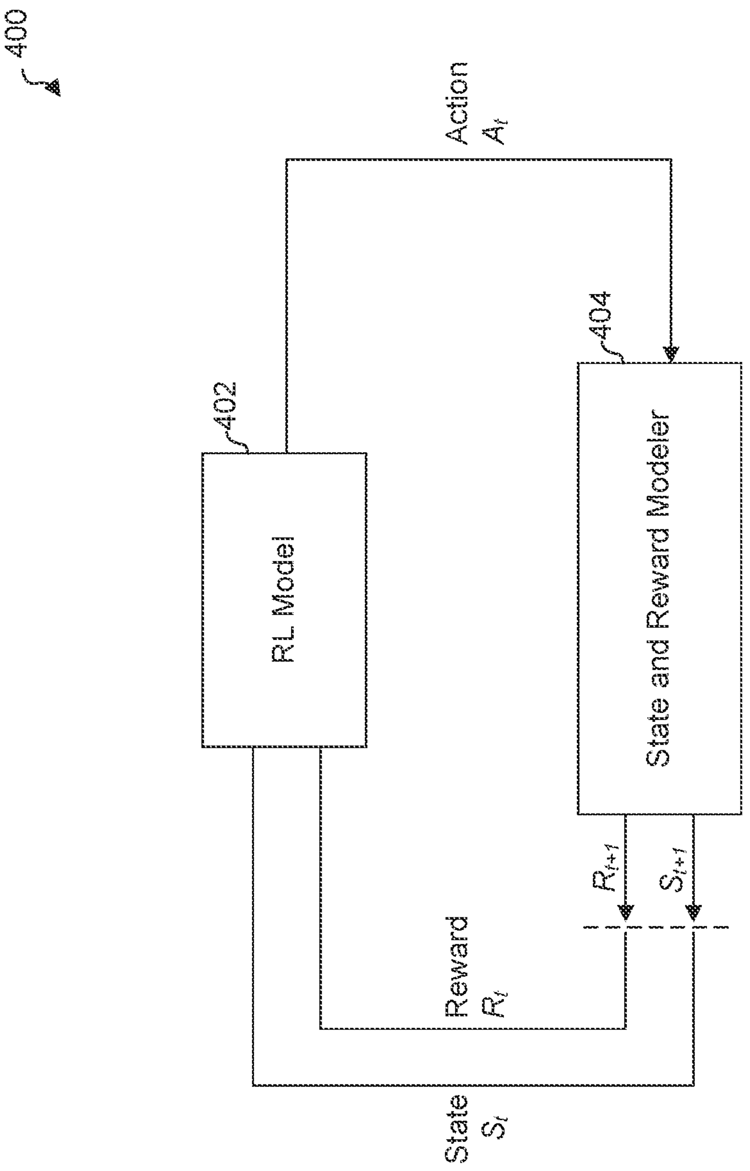
FIG. 4 illustrates a block diagram of a reinforcement learning (RL) system that may be used to implement a user experience optimization system, according to some embodiments.

In still further embodiments, hyperparameter tuning ML model 312 may comprise an RL model. In this regard, FIG. 4 illustrates a block diagram of an RL system 400 that may be used to implement user experience optimization system 128, according to some embodiments. For example, RL system 400 may be used to implement hyperparameter tuner 310 as described above in reference to FIG. 3. As shown in FIG. 4, RL system 400 may include an RL model 402 (which may be analogous to hyperparameter tuning ML model 312 in FIG. 3) and a state and reward modeler 404. Each of these components may be implemented by processing logic that can comprise hardware (e.g., circuitry, dedicated logic, programmable logic, microcode, etc.), software (e.g., instructions executing on a processing device), or a combination thereof. Each of these components will now be described.

RL model 402 may operate to select an action $A_t$ for each user experience trial t, where t=1, 2, 3, . . . . In embodiments, RL model 402 selects the action $A_t$ by first selecting a deterministic policy $\pi(s)$ for trial t based at least on a state $S_t$ and a reward $R_t$ associated with trial t, and then selects the action $A_t$ based on the deterministic policy $\pi(s)$. The deterministic policy $\pi(\alpha|s)$ may specify which action a to take in state s. In alternate embodiments, RL model 402 selects the action $A_t$ by first selecting a stochastic policy $\pi(\alpha|s)$ for trial t based at least on state $S_t$ and reward $R_t$ associated with trial t, and then selects the action $A_t$ based on stochastic policy $\pi(\alpha|s)$. The stochastic policy $\pi(\alpha|s)$ may specify probabilities for taking action a in each state s. The action $A_t$ selected by RL model 402 may be the set of hyperparameter values 314 for trial t, as discussed above in reference to FIG. 3. Although not shown in FIG. 4, RL model 402 may also select the deterministic policy $\pi(s)$ or the stochastic policy $\pi(\alpha|s)$ for trial t based on historical trial information, such as historical trial information 308 as discussed above in reference to FIG. 3.

State and reward modeler 404 may operate to generate information representative of a state $S_{t+1}$ and a reward $R_{t+1}$ associated with a trial t+1, and that may have resulted from the execution of action $A_t$. In embodiments, the state $S_{t-1}$ may be represented by certain information about user 132 (e.g., information relating to user interactions with media system 104 and/or media device 106 and/or demographic information) as well as by certain context information (e.g., day of week, time of day, date, location, or device type). For example, the state $S_{t+1}$ may be represented by any of the information described above in connection with state information 306 of FIG. 3. In embodiments, the reward $R_{t+1}$ may be represented by a measure of user response to the user experience provided using ML model 318 implemented with the set of hyperparameter values 314 selected as action $A_t$. For example, the reward $R_{t+1}$ may be represented by any of the information described above in connection with user response information 302.

As shown in FIG. 4, the state $S_{t+1}$ and a reward $R_t$, associated with trial t+1 becomes the inputs $S_t$ and $R_t$ that are then used by RL model 402 to select a new deterministic policy $\pi(s)$ or a new stochastic policy $\pi(\alpha|s)$ for determining $A_t$ for the next user experience trial. This process may continue for any number of user experience trials.

RL system 400 of FIG. 4 is presented in a form that may be associated with a wide variety of RL system implementations. Thus, persons skilled in the relevant art(s) will appreciate that RL model 402 may be implemented using a wide variety of RL algorithms whether currently known or hereinafter developed.

As will be appreciated by persons skilled in the relevant arts, CMAB and RL models may operate to iteratively explore various actions to try and maximize a long-term cumulative reward (e.g. through value iteration, policy gradient, or the like). This feature of these models can help user experience optimization system 128 to discover a personalized set of optimal hyperparameters for each user 132 over a series of user experience trials.

In an embodiment in which hyperparameter tuning ML model 312 is a CMAB model, the action space of the CMAB model may be adapted from a continuous action space to a discrete one. For example, the action space for a CMAB model could be a set of K hyperparameter value configurations sampled from a continuous hyperparameter space. In further accordance with this example, if a given hyperparameter can have a value ranging from 0 to 100, ten points could be sampled in the range of 0 to 1 and ninety points could be sampled in the range from 1 to 100, providing a possibility of one hundred discrete values for the hyperparameter. However, if the CMAB model is being used to select values for N hyperparameters, each of which can have one of 100 different discrete values, then the total number of possible hyperparameter configurations K will be $100^N$. Consequently, if Nis large, the action space may be too large for the model to converge in a reasonable or practical timeframe.

To address this technical issue, embodiments may reduce the action space of the CMAB model by limiting the possible actions for a given trial to one of an increment action or a decrement action for each hyperparameter. The increment action and decrement action may be, for example, for a fixed number of discrete steps (e.g., one discrete step). If there are N hyperparameters as discussed above, this will limit the size of the action space to $2^N$. This can significantly improve the performance of the CMAB model in cases where there are large numbers of hyperparameters and/or hyperparameters with a large number of potential discrete values. Furthermore, in accordance with such an implementation, the user experience that is being controlled based on the hyperparameters selected by the CMAB model may change in a gradual manner that is not jarring to the user, given that the hyperparameters can only be incremented or decremented by a fixed number of discrete units (e.g., one discrete unit) per user experience trial.

Alternatively, in an embodiment in which hyperparameter tuning ML model 312 is an RL model, an RL algorithm that is specifically adapted for environments with continuous action spaces may be used to select the set of hyperparameter values for each trial. For example, a policy gradient algorithm may be used. One example of a policy gradient algorithm is the Deep Deterministic Policy Gradient (DDPG) algorithm described in T. Lillicrap, "Continuous Control with Deep Reinforcement Learning", ICLR 2016.

In an embodiment in which user experience optimization system 128 is configured to recommend content items that will maximize user interaction therewith, hyperparameter tuning ML model 312 may comprise a CMAB model (e.g., LinUCB) that operates to select a set of hyperparameter values 314 for ML model 318 that will best enable ML model 318 to predict content items that user 132 is most likely to interact with (e.g., click on, launch for playback, or watch/stream). In such an embodiment, user response information 302 may comprise a measure of interaction by user 132 with content items that were recommended during a previous user experience trial, and the CMAB model may operate to learn an optimal set of hyperparameters for maximizing user-content interactions across a series of user experience trials.

In an embodiment in which different content items generate different amounts of revenue when interacted with by user 132 and user experience optimization system 128 is configured to maximize revenue per session, user response information 302 may instead comprise a first measure of interaction by user 132 with a first type of content that provides a first amount of revenue per unit streaming time and a second measure of interaction by user 132 with a second type of content that provides a second amount of revenue per unit streaming time. In an embodiment in which the respective measures of interaction are click-through rates, the first type of content is direct license content, and the the second type of content is revenue share content, the first measure may be denoted clr_dl and the second measure may be denoted ctr_rev. In further accordance with such an embodiment, the per session revenue may be calculated as:

ctr_dl*streaming_per_click_dl*dl_margin+
ctr_rev*streaming_per_click_rev_share*rev_share_margin, where streaming_per_click_dl is an expected streaming time resulting from clicking on direct license content, dl_margin is an amount of revenue earned per unit streaming time for direct license content, streaming_per_click_rev_share is an expected streaming time resulting from clicking on revenuse share content, and rev_share_margin is an amount of revenue earned per unit streaming time for revenue share content. By including this measure within user response information 302, the CMAB model may operate to learn an optimal set of hyperparameters for maximizing revenue per session for user 132 across a series of user experience trials. In an embodiment in which hyperparameter tuning ML model 312 is an RL model, the accumulative return to be maximized may be an estimated long term revenue that is calculated as the sum of the user's total streaming time for direct license content*dl_margin and the user's total streaming time for revenue share content*rev_share_margin.

Figure 5:
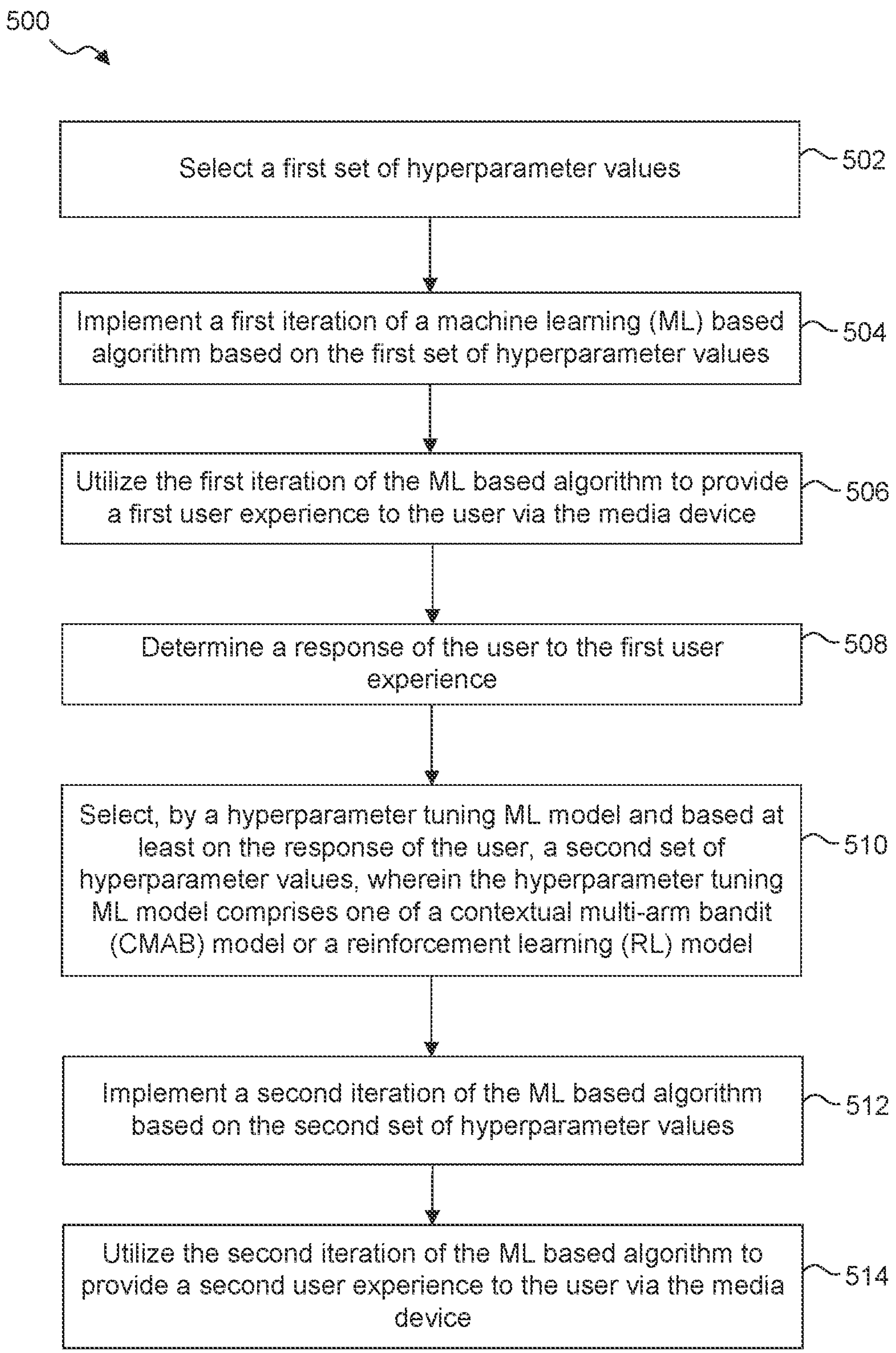
FIG. 5 illustrates a flow diagram of a method for improving the performance of an ML based algorithm used to provide a user experience to a user via a media device, according to some embodiments.

FIG. 5 is a flow diagram for a method 500 for improving the performance of an ML model used to provide a user experience to a user via a media device, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall first be described with reference to the embodiment of user experience optimization system 128 depicted in FIG. 3, although method 500 is not limited to that embodiment.

In 502, hyperparameter tuning ML model 312 of hyperparameter tuner 310 selects a first set of hyperparameter values 314 for a user experience trial t. The first set of hyperparameter values 314 may comprise values/settings corresponding to a set of hyperparameters, wherein the set of hyperparameters may comprise one hyperparameter or more than one hyperparameter.

In 504, ML based algorithm implementer 316 implements a first iteration of an ML based algorithm (e.g., a first iteration of ML based algorithm 318) based on the first set of hyperparameter values 314. For example, ML based algorithm implementer 316 may control a training process in accordance with the first set of hyperparameter values 314 to generate a first iteration of an ML model used by the ML based algorithm. In embodiments, ML based algorithm implementer 316 may select a first ML model to be used by the ML based algorithm from among a set of candidate ML models based on the first set of hyperparameter values 314. In still further embodiments, ML based algorithm implementer 316 may utilize the first set of hyperparameter values 314 to select weights for combining predictions or scores generated by different ML models used by the ML based algorithm, to select a value of a boosting factor that is applied to a ranking score generated by an ML model used by the ML based algorithm, or to select weights for determining a user interest distribution for recommendations generated by an ML model used by the ML based algorithm.

In 506, user experience controller 320 utilizes the first iteration of the ML based algorithm (e.g., the first iteration of ML based algorithm 318) to provide a first user experience to user 132 via media device 106 during user experience trial t. For example, user experience controller 320 may utilize the first iteration of the ML based algorithm to identify content to recommend to user 132 via media device 106 during trial t, to determine a format and/or content of a user interface that will be displayed to user 132 via media device 106 during trial t, or to select a set of content streaming parameters (e.g., resolution, bit rate, frame rate, encoding type, or the like) that will be used to stream content to user 132 via media device 106 during trial t. However, these are only a few examples, and user experience controller 320 may utilize the first iteration of the ML based algorithm to control any aspect of a user experience to be provided to user 132 via media device 106 during trial t.

In 508, hyperparameter tuner 310 (or other component of user experience optimization system 128) determines a response of user 132 to the first user experience during trial t. As discussed elsewhere herein, the response of user 132 may be represented by user response information 302 and may be derived, in some embodiments, from system logs that track interactions of user 132 with a user interface provided by media device 106.

In 510, hyperparameter tuning ML model 312 selects a second set of hyperparameter values 314 for trial t+1 based at least on the response of the user to the first user experience during trial t (e.g., as represented by user response information 302). As discussed elsewhere herein, hyperparameter tuning ML model 312 may be implemented as a CMAB model or an RL model. In an embodiment in which hyperparameter tuning ML model 312 comprises a CMAB model, hyperparameter tuning ML model 312 may select the second set of hyperparameter values based at least on context information 304 and the response of the user. In an embodiment in which hyperparameter tuning ML model 312 comprises an RL model, hyperparameter tuning ML model 312 may select the second set of hyperparameter values based at least on state information 306 and the response of the user. In embodiments, hyperparameter tuning ML model 312 may also take into account historical trial information 308 in selecting the second set of hyperparameter values 314.

In an embodiment in which hyperparameter tuning ML model 312 comprises an RL model, selecting the second set of hyperparameter values 314 may comprise determining, by hyperparameter tuning ML model 312 and based at least on the response of the user, a deterministic policy or a stochastic policy, and selecting the second set of hyperparameter values based on the deterministic policy or the stochastic policy.

In an embodiment in which hyperparameter tuning ML model 312 comprises a CMAB model and the action space has been adapted from a continuous space to a discrete space through sampling, selecting the set of second hyperparameter values 314 may comprise selecting whether to increment or decrement each hyperparameter value in the first set of hyperparameter values 314 by a fixed number of discrete steps (e.g., one discrete step).

In 512, ML based algorithm implementer 316 implements a second iteration of the ML based algorithm (e.g., a second iteration of ML based algorithm 318) based on the second set of hyperparameter values 314. For example, ML based algorithm implementer 316 may control a training process in accordance with the second set of hyperparameter values 314 to generate a second iteration of an ML model used by the ML based algorithm. In embodiments, ML based algorithm implementer 316 may select a second ML model to be used by the ML based algorithm from among a set of candidate ML models based on the second set of hyperparameter values 314. In still further embodiments, ML based algorithm implementer 316 may utilize the second set of hyperparameter values 314 to select weights for combining predictions or scores generated by different ML models used by the ML based algorithm, to select a value of a boosting factor that is applied to a ranking score generated by an ML model used by the ML based algorithm, or to select weights for determining a user interest distribution for recommendations generated by an ML model used by the ML based algorithm.

In 514, user experience controller 320 utilizes the second iteration of the ML based algorithm (e.g., a second iteration of ML based algorithm 318) to provide a second user experience to user 132 via media device 106 during user experience trial t+1. For example, user experience controller 320 may utilize the second iteration of the ML based model to identify content to recommend to user 132 via media device 106 during trial t+1, to determine a format and/or content of a user interface that will be displayed to user 132 via media device 106 during trial t+1, or to select a set of content streaming parameters (e.g., resolution, bit rate, frame rate, encoding type, or the like) that will be used to stream content to user 132 via media device 106 during trial t−1. However, these are only a few examples, and user experience controller 320 may utilize the second iteration of the ML based algorithm to control any aspect of a user experience to be provided to user 132 via media device 106 during trial t+1.

Example Computer System

Figure 6:
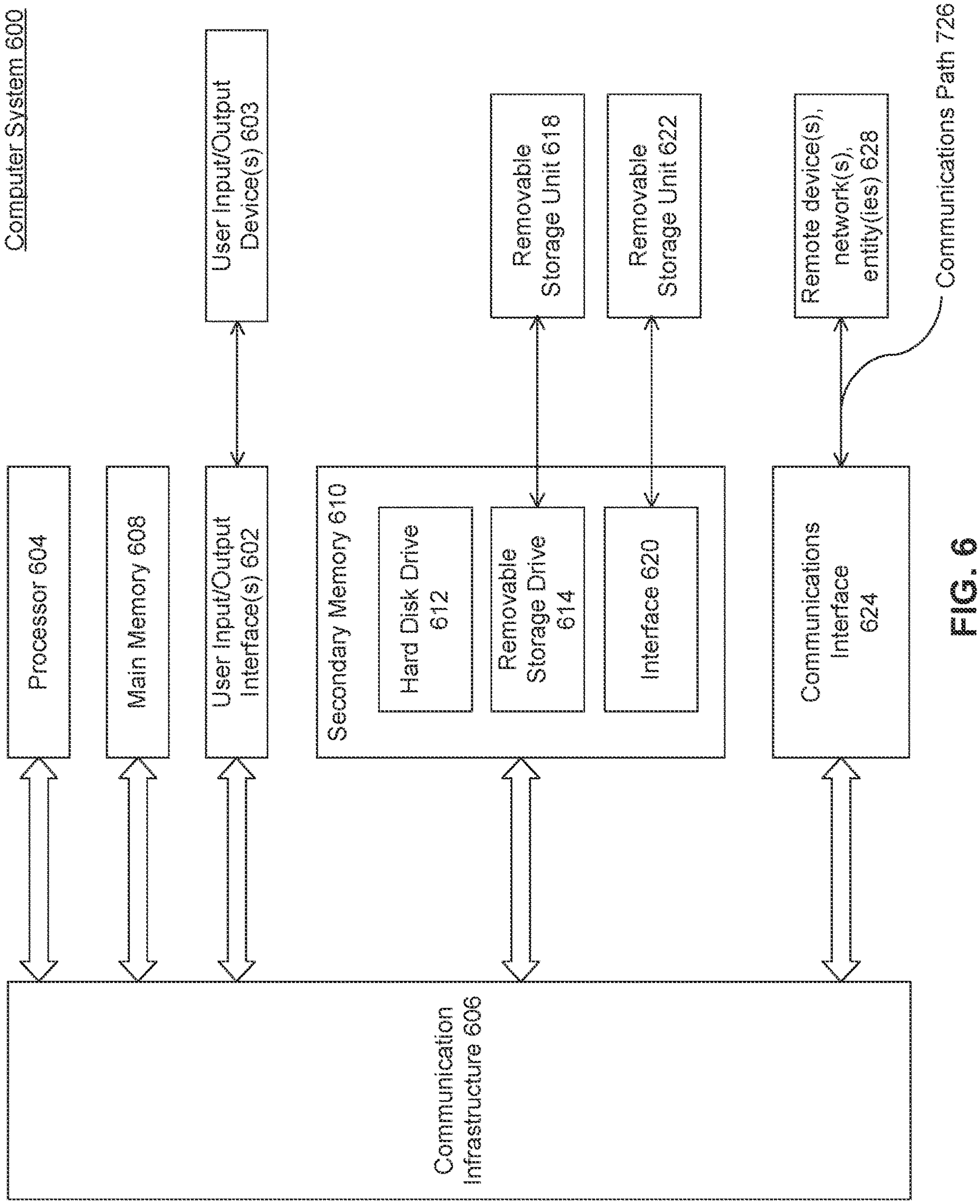
FIG. 6 illustrates an example computer system useful for implementing various embodiments.

Various embodiments may be implemented, for example, using one or more well-known computer systems, such as computer system 600 shown in FIG. 6. For example, one or more of media device 106, remote control 110, content server(s) 120, system server(s) 126, user experience optimization system 128, hyperparameter tuner 310, hyperparameter tuning ML model 312, ML based algorithm implementer 316, ML based algorithm 318, user experience controller 320, RL model 402, or state and reward modeler 404 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for improving performance of a machine learning (ML) based algorithm used to provide a user experience to a user via a media device, comprising:

selecting, by at least one computer processor, a first set of hyperparameter values;

implementing a first iteration of the ML based algorithm based on the first set of hyperparameter values;

utilizing the first iteration of the ML based algorithm to provide a first user experience to the user via the media device;

determining a response of the user to the first user experience based on deriving, from system logs that record interactions of the user with a user interface of the media device during the first user experience, user response information including at least one interaction metric comprising at least one of user clicks, content launches, streaming time, or revenue generated by interactions with presented content;

selecting, by a hyperparameter tuning ML model and based at least on the response of the user, a second set of hyperparameter values, wherein the hyperparameter tuning ML model comprises one of a contextual multi-arm bandit (CMAB) model or a reinforcement learning (RL) model;

implementing a second iteration of the ML based algorithm based on the second set of hyperparameter values; and utilizing the second iteration of the ML based algorithm to provide a second user experience to the user via the media device.

2. The computer-implemented method of claim 1, wherein implementing the first iteration of the ML based algorithm based on the first set of hyperparameter values comprises controlling a training process in accordance with the first set of hyperparameter values to generate a first iteration of an ML model used by the ML based algorithm, and wherein implementing the second iteration of the ML based algorithm based on the second set of hyperparameter values comprises controlling the training process in accordance with the second set of hyperparameter values to generate a second iteration of the ML model used by the ML based algorithm.

3. The computer-implemented method of claim 1, wherein implementing the first iteration of the ML based algorithm based on the first set of hyperparameter values comprises selecting a first ML model to be used by the ML based algorithm from among a set of candidate ML models based on the first set of hyperparameter values, and wherein implementing the second iteration of the ML based algorithm based on the second set of hyperparameter values comprises selecting a second ML model to be used by the ML based algorithm from among the set of candidate ML models based on the second set of hyperparameter values.

4. The computer-implemented method of claim 1, wherein the hyperparameter tuning ML model comprises the CMAB model and selecting the second set of hyperparameter values comprises:

selecting, by the CMAB model and based at least on context information and the response of the user, the second set of hyperparameter values.

5. The computer-implemented method of claim 1, wherein the hyperparameter tuning ML model comprises the RL model and selecting the second set of hyperparameter values comprises:

selecting, by the RL model and based at least on state information and the response of the user, the second set of hyperparameter values.

6. The computer-implemented method of claim 1, wherein selecting the second set of hyperparameter values comprises:

selecting whether to increment or decrement each hyperparameter value in the first set of hyperparameter values by a fixed number of discrete steps.

7. The computer-implemented method of claim 1, wherein selecting the second set of hyperparameter values comprises:

determining, by the hyperparameter tuning ML model and based at least on the response of the user, a deterministic policy or a stochastic policy; and selecting the second set of hyperparameter values based on the deterministic policy or the stochastic policy.

8. A system for improving performance of a machine learning (ML) based algorithm used to provide a user experience to a user via a media device, comprising:

one or more memories; and at least one processor each coupled to at least one of the memories and configured to perform operations comprising:

selecting a first set of hyperparameter values;

implementing a first iteration of the ML based algorithm based on the first set of hyperparameter values;

utilizing the first iteration of the ML based algorithm to provide a first user experience to the user via the media device;

determining a response of the user to the first user experience based on deriving, from system logs that record interactions of the user with a user interface of the media device during the first user experience, user response information including at least one interaction metric comprising at least one of user clicks, content launches, streaming time, or revenue generated by interactions with presented content;

selecting, by a hyperparameter tuning ML model and based at least on the response of the user, a second set of hyperparameter values, wherein the hyperparameter tuning ML model comprises one of a contextual multi-arm bandit (CMAB) model or a reinforcement learning (RL) model;

implementing a second iteration of the ML based algorithm based on the second set of hyperparameter values; and utilizing the second iteration of the ML based algorithm to provide a second user experience to the user via the media device.

9. The system of claim 8, wherein implementing the first iteration of the ML based algorithm based on the first set of hyperparameter values comprises controlling a training process in accordance with the first set of hyperparameter values to generate a first iteration of an ML model used by the ML based algorithm, and wherein implementing the second iteration of the ML based algorithm based on the second set of hyperparameter values comprises controlling the training process in accordance with the second set of hyperparameter values to generate a second iteration of the ML model used by the ML based algorithm.

10. The system of claim 8, wherein implementing the first iteration of the ML based algorithm based on the first set of hyperparameter values comprises selecting a first ML model to be used by the ML based algorithm from among a set of candidate ML models based on the first set of hyperparameter values, and wherein implementing the second iteration of the ML based algorithm based on the second set of hyperparameter values comprises selecting a second ML model to be used by the ML based algorithm from among the set of candidate ML models based on the second set of hyperparameter values.

11. The system of claim 8, wherein the hyperparameter tuning ML model comprises the CMAB model and selecting the second set of hyperparameter values comprises:

selecting, by the CMAB model and based at least on context information and the response of the user, the second set of hyperparameter values.

12. The system of claim 8, wherein the hyperparameter tuning ML model comprises the RL model and selecting the second set of hyperparameter values comprises:

selecting, by the RL model and based at least on state information and the response of the user, the second set of hyperparameter values.

13. The system of claim 8, wherein selecting the second set of hyperparameter values comprises:

selecting whether to increment or decrement each hyperparameter value in the first set of hyperparameter values by a fixed number of discrete steps.

14. The system of claim 8, wherein selecting the second set of hyperparameter values comprises:

determining, by the hyperparameter tuning ML model and based at least on the response of the user, a deterministic policy or a stochastic policy; and selecting the second set of hyperparameter values based on the deterministic policy or the stochastic policy.

15. A non-transitory computer-readable medium having instructions stored thereon that, when executed by at least one computing device, causes the at least one computing device to perform operations for improving performance of a machine learning (ML) based algorithm used to provide a user experience to a user via a media device, the operations comprising:

selecting a first set of hyperparameter values;

implementing a first iteration of the ML based algorithm based on the first set of hyperparameter values;

utilizing the first iteration of the ML based algorithm to provide a first user experience to the user via the media device;

determining a response of the user to the first user experience based on deriving, from system logs that record interactions of the user with a user interface of the media device during the first user experience, user response information including at least one interaction metric comprising at least one of user clicks, content launches, streaming time, or revenue generated by interactions with presented content;

selecting, by a hyperparameter tuning ML model and based at least on the response of the user, a second set of hyperparameter values, wherein the hyperparameter tuning ML model comprises one of a contextual multi-arm bandit (CMAB) model or a reinforcement learning (RL) model;

implementing a second iteration of the ML based algorithm based on the second set of hyperparameter values; and utilizing the second iteration of the ML based algorithm to provide a second user experience to the user via the media device.

16. The non-transitory computer-readable medium of claim 15, wherein implementing the first iteration of the ML based algorithm based on the first set of hyperparameter values comprises controlling a training process in accordance with the first set of hyperparameter values to generate a first iteration of an ML model used by the ML based algorithm, and wherein implementing the second iteration of the ML model based on the second set of hyperparameter values comprises controlling the training process in accordance with the second set of hyperparameter values to generate a second iteration of the ML model used by the ML based algorithm.

17. The non-transitory computer-readable medium of claim 15, wherein implementing the first iteration of the ML based algorithm based on the first set of hyperparameter values comprises selecting a first ML model to be used by the ML based algorithm from among a set of candidate ML models based on the first set of hyperparameter values, and wherein implementing the second iteration of the ML based algorithm based on the second set of hyperparameter values comprises selecting a second ML model to be used by the ML based algorithm from among the set of candidate ML models based on the second set of hyperparameter values.

18. The non-transitory computer-readable medium of claim 15, wherein the hyperparameter tuning ML model comprises the CMAB model and selecting the second set of hyperparameter values comprises:

selecting, by the CMAB model and based at least on context information and the response of the user, the second set of hyperparameter values.

19. The non-transitory computer-readable medium of claim 15, wherein the hyperparameter tuning ML model comprises the RL model and selecting the second set of hyperparameter values comprises:

selecting, by the RL model and based at least on state information and the response of the user, the second set of hyperparameter values.

20. The non-transitory computer-readable medium of claim 15, wherein selecting the second set of hyperparameter values comprises:

selecting whether to increment or decrement each hyperparameter value in the first set of hyperparameter values by a fixed number of discrete steps.

* * * * *